United States Patent [19]

Freiberg

[11] 4,025,172

[45] May 24, 1977

[54] COMPOUND UNSTABLE RESONATOR

[75] Inventor: Robert J. Freiberg, South Windsor, Conn.

[73] Assignee: United Technologies Corporation, Hartford, Conn.

[22] Filed: Oct. 9, 1975

[21] Appl. No.: 620,995

[52] U.S. Cl. .......................... 350/294; 331/94.5 C; 350/299
[51] Int. Cl.² .......................................... G02B 5/10
[58] Field of Search .............. 331/94.5 C; 350/293, 350/294, 299

[56] References Cited

UNITED STATES PATENTS

| | | |
|---|---|---|
| 3,622,907 | 11/1971 | Tomlinson et al. ........... 331/94.5 C |
| 3,921,096 | 11/1975 | Chenausky et al. .......... 331/94.5 C |
| 3,950,712 | 4/1976 | Chenausky et al. .......... 331/94.5 C |

Primary Examiner—John K. Corbin
Assistant Examiner—F. L. Evans
Attorney, Agent, or Firm—Anthony J. Criso

[57] ABSTRACT

A modification to the reflective surfaces in unstable resonator assemblies to improve the operating characteristics of such devices and enhance the quality in the far field of the output beam from such resonators is disclosed. Some modifications include the elimination of abrupt discontinuities in the reflective surfaces and the forming of an auxiliary unstable resonator along the centerline axis of the primary resonator and result in increased symmetry in the operating characteristics of the system in the gain region and improved intensity profile in the far field for the output beam. The concept is applicable to axial as well as radial flow resonators having either circular or cylindrical optics.

11 Claims, 4 Drawing Figures

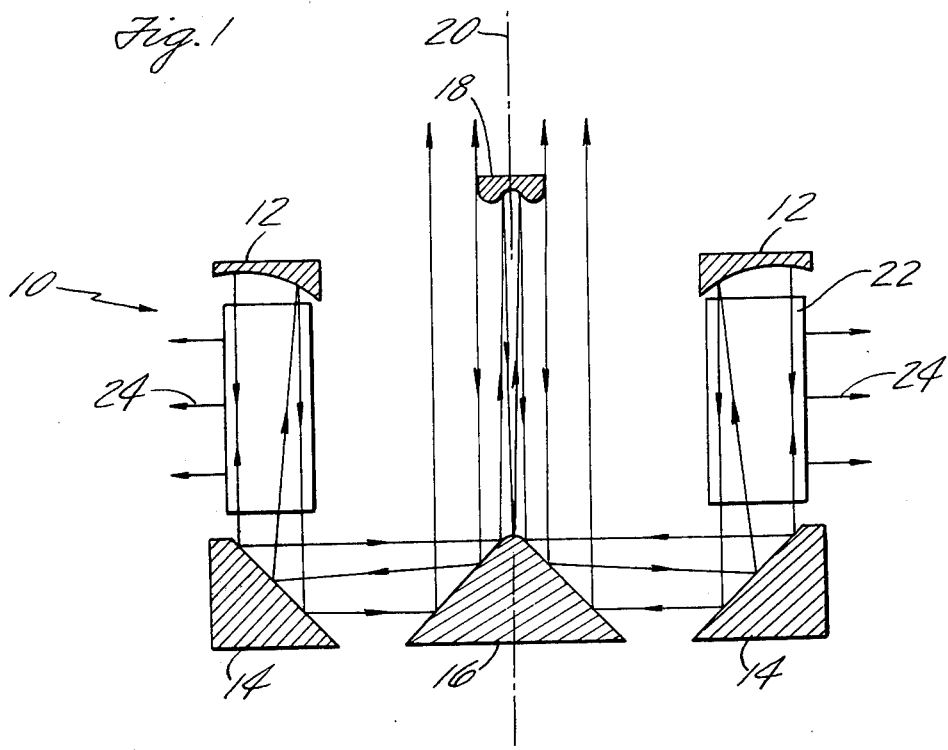
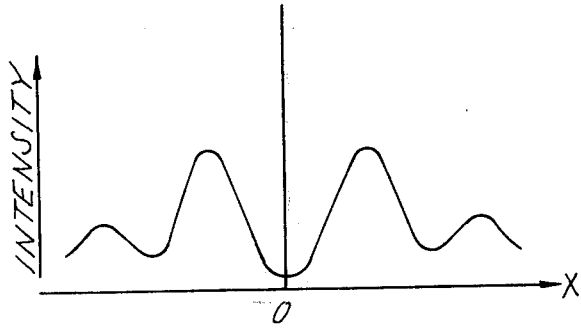
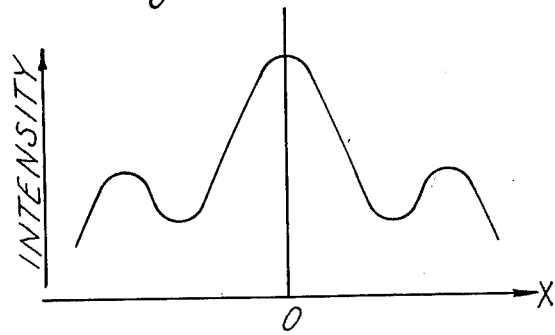

COMPOUND UNSTABLE RESONATOR

BACKGROUND OF THE INVENTION

1. Field of Invention The present invention relates to unstable resonators and more particularly to unstable laser resonators having an optical path which extends in a radial direction.

2. Description of the Prior Art In various unstable laser resonators such as those typified by U.S. Pat. No. 3,921,096, entitled *Unstable Split Mode Lase Resonator*, filed on Dec. 16, 1974, U.S. Pat. No. 3,950,712, entitled *Unstable Laser Resonator Having Radial Propagation*, filed Apr. 14, 1975, U.S. Pat. No. 3,969,687, entitled *Standing Wave Unstable Resonators For Radial Flow Lasers*, filed Apr. 14, 1975, and U.S. Pat No. 3,969,688, entitled *Traveling Wave Unstable Resonators For Radial Flow Lasers*, filed Apr. 10, 1975, each of which is held with the present invention by common assignee, there is a need to transform the circulating power from an annular or a radially extending region into a circular beam from which power is coupled out of the resonator. Such transformations are typically accomplished with a folding mirror which, for example, is a cone having a conical reflective surface which terminates at a point apex or a triangular prism having two flat reflective surfaces which intersect along a straight line apex. The presence of a folding mirror having a sharp discontinuity due to an apex causes the resonator to operate in other than its lowest order mode which in turn reduces the amount of energy on axis in the far field energy distribution for the beam of radiation coupled out of such a resonator. Any techniques which would allow an unstable resonator having a mirror with a severe discontinuity such as results at the apex of a conical folding mirror to resonate at the lowest order symmetric mode possible would broaden the fields of application for unstable laser resonators.

SUMMARY OF THE INVENTION

An object of the present invention is to improve the intracavity mode discrimination in an unstable resonator against higher order azimuthal modes to improve the optical quality in the far field of a laser beam from an unstable resonator.

According to the present invention, subtle refinements are made to the overall contour of the reflective surfaces in an unstable resonator to form an auxiliary unstable resonator which is completely internal to the primary resonator. In a specific unstable resonator having an annular end mirror, a circular end mirror and a conical folding mirror each of which is symmetrically disposed about a centerline axis through the resonator, the reflective surfaces at the apex of the conical mirror and at the center of the circular mirror are modified to form the auxiliary resonator therebetween symmetric about the primary resonator axis.

One of the characteristics of the present invention is the Fresnel Number of the auxiliary resonator is small. Also, the radial profile of the spatial energy distribution is of a lower order than occurs from the same primary resonator configuration without the modified reflective surfaces which describe an auxiliary resonator along the centerline. The auxiliary resonator comprises various combinations of convex, concave and planar reflective surfaces. In an unstable resonator configuration having an annularly shaped gain region and a circularly shaped beam along the axial centerline of the annulus, the ray trace from the outermost portion of the annular region does not pass along the centerline axis but rather is displaced therefrom by some distance. Such ray traces from the outermost portion of the annular gain region located the transition or interface betweeen the primary and auxiliary resonators. The auxiliary resonator is necessarily near confocal so that the radiation returning to the centerline region from the annular region propagates the auxiliary resonator in a gradual manner and is thereby returned to the annular region in a not too divergent condition. The point of optical symmetry for each of the surfaces forming the auxiliary resonator must be on the optical axis of symmetry of the primary resonator.

The use of an auxiliary resonator improves the optical communication between various portions of the active medium thereby minimizing the deleterious effects of azimuthal variation in the index of refraction in the gain medium. The elimination of the point at the apex of the folding mirror simplifies the cooling requirements of the mirror and increases the flux handling capacity of this mirror. The elimination of such points also reduces the fabrication problems associated with such a mirror. The presence of the auxiliary resonator allows a lower order intracavity mode of operation for the primary resonator thereby avoiding a center void which is associated with higher order azimuthally asymmetric modes, and increasing the amount of energy in the central maximum in the far field for the energy diffractively coupled out of the primary resonator.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 1 is a simplified schematic showing an elevation view of a compound unstable resonator in accordance with the present invention;

FIG. 3 is a simplified sketch of the intensity profile in the far field of the output beam from a cylindrical, unstable resonator operating in the lowest loss mode which is azimuthally asymmetric;

FIG. 4 is a simplified sketch of the intensity profile in the far field of the output beam from a compound unstable resonator operating in accordance with the present invention in the lowest loss mode which is azimuthally symmetric.

DESCRIPTION OF THE PREFERRED EMBODIMENT

Figure 2:
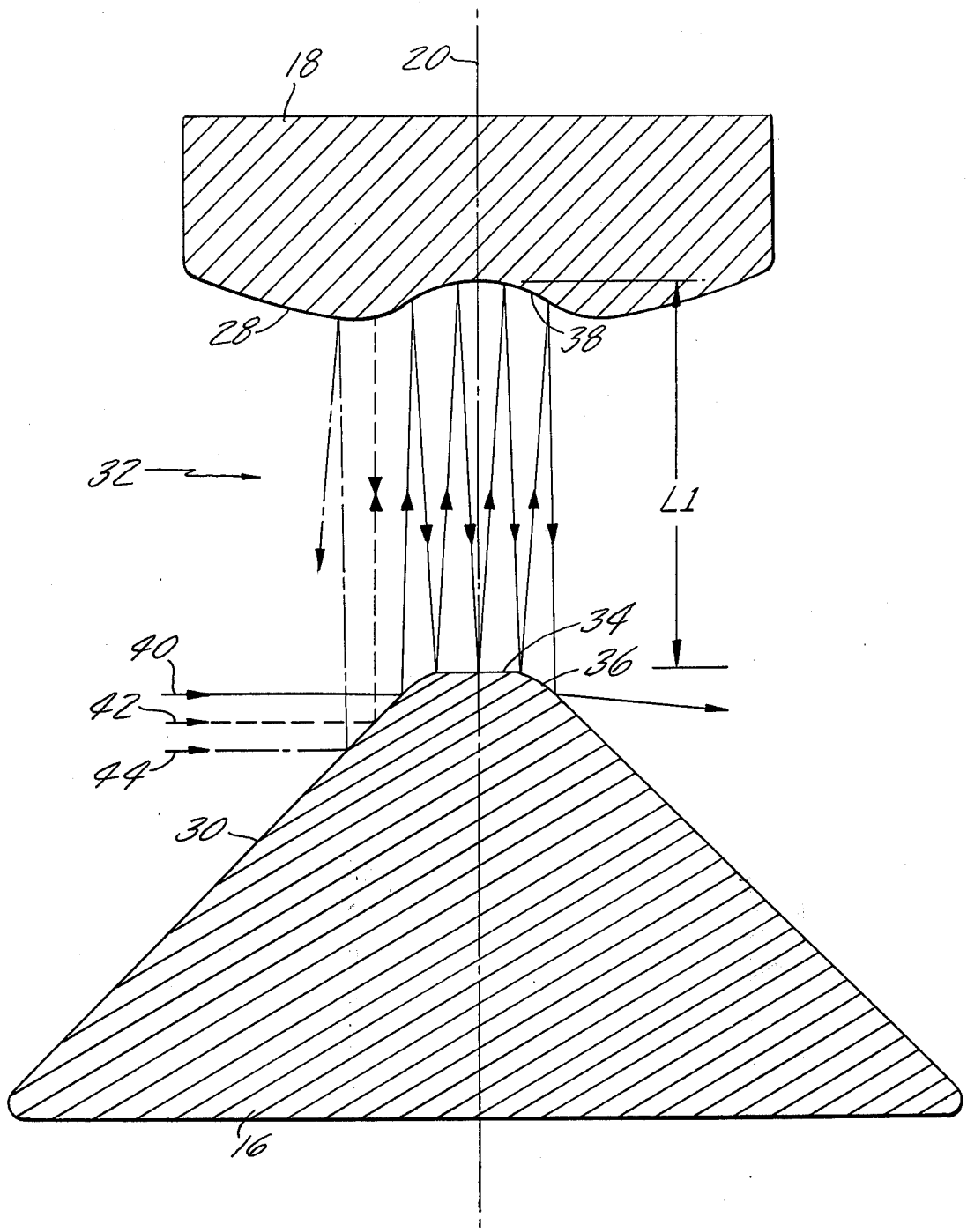
FIG. 2 is a sketch showing typical ray traces through the auxiliary unstable resonator portion of the compound resonator and the contour of the reflective surfaces forming a typical auxiliary resonator.

The present invention is discussed herein primarily in the context of a resonator having optics to produce an output beam which is circular in cross section although the invention is equally applicable to resonators which provide an output beam having an essentially rectangular cross section.

Referring to FIG. 1, a primary resonator 10 is formed with an annular end mirror 12, an annular folding mirror 14, a conical folding mirror 16 and a circular end mirror 18. The resonator is cylindrical overall and symmetric about a centerline axis 20 which passes through the center of the folding mirror 16 and the end mirror 18. The active gain medium is in the shape of a relatively thin cylinder 22 extending between the end mirror 12 and the folding mirror 14. The gain medium is produced by means not shown in FIG. 1 and flows in a radial direction 24 away from the centerline axis.

The folding mirror 16 and the end mirror 18 are shown in greater detail in FIG. 2. The ciruclar end mirror has an essentially convex reflective surface 28 except in the region in the vicinity of the axis 20 and the conical folding mirror has a conical reflective surface 30 which is essentially flat whereby an auxiliary unstable resonator 32 symmetric about the axis 20 is formed between these two mirrors. At the top of the conical mirror is a compound reflective surface including a flat reflective surface 34 perpendicular to the axis 20 and a convexly curved reflective surface 36 having a radius of curvature R1. The flat surface 34 and the curved surface 36 are symmetric about the axis 20. In an analogous manner the center of the circular mirror 20 is modified to include a concave reflective surface 38 which is spherically symmetric about the axis and the construction is not unlike the reflective surface configuration discussed in U.S. Pat No. 3,622,901 entitled *Composite Oscillator Amplifier Laser* filed Jan. 27, 1970 and held with the present invention by common assignee.

The radius of curvature R2 of the concave surface 38 is such that the difference between the radii of curvature R1 and R2 is substantially equal to twice the separation distance L1 between the surfaces forming the auxiliary resonator thereby establishing the near confocality of the auxiliary resonator. With such geometries, the divergence of the rays leaving the auxiliary resonator are constrained to propagate within the bounds of the primary resonator and allow efficient operation. If the auxiliary resonator departs substantially from such conditions, the radiation from the resonator diverges sufficiently to cause a substantial reduction in the amount of power extractable from the compound resonator.

The functional characteristics which the auxiliary resonator introduces into the primary resonator are multiple; for example, the abrupt discontinuity which otherwise appears at the sharp apex of the folding mirror 16 is eliminated thereby enabling the lowest loss mode to be associated with a lower order intracavity mode than would result in the presence of the sharp apex. The lowest loss mode of a resonator is the mode characterized by the lowest diffractive losses. The characteristics of such modes are a function of the geometry of the resonator. For example, in some cases the lowest loss mode may exhibit azimuthal phase variation and in others the phase of the lowest loss mode is symmetric. In those instances in which the mode is asymmetric in the resonator, the beam distribution in the far field experiences destructive interference and results in a minimum on axis intensity as shown in FIG. 3; the displacement distance from the centerline is represented by the quantity X. In those instaces in which the mode is symmetric in the resonator, the far field pattern experiences constructive interference and results in maximum intensity on axis as is shown in FIG. 4.

The elimination of the point on the conical folding mirror permits a phase symmetric intracavity mode wherein the azimuthal quantum number of the resonator mode is zero. The physical significance of this lower order mode is shown with reference to FIGS. 3 and 4.

In FIG. 3 the typical spatial distribution of the on axis energy in the far field is shown for an unstable resonator having a conical folding mirror which terminates at a point apex and is therefore azimuthally asymmetric. The on axis power is relatively low due to the pointed folding mirror in the resonator which forces the system to operate at a higher order mode having near field azimuthal phase variations and destructive interference of the field on the axis of the far field distribution. By way of contrast, the spatial distribution of the on axis energy from the unstable resonator having an auxiliary resonator in accordance with the present invention is shown in FIG. 4. The presence of the auxiliary resonator eliminates the abrupt discontinuity which otherwise occurs at the apex of the folding mirror thereby allowing the primary resonator to operate in the lowest order intracavity mode which in turn provides the maximum on axis power in the far field distribution as shown.

The functional interrelationship between the overall convex end mirror 18 and the conical folding mirror 16 can be described well with reference to the ray trace for a first ray 40 which strikes the folding mirror and passes through the auxiliary resonator, a second ray 42 which strikes the folding mirror and travels along the interface of the auxiliary resonator and the primary resonator, and a third ray 44 which strikes the folding mirror and is not influenced directly by the presence of the auxiliary resonator. The first ray 40 strikes the curved surface 36 of the folding mirror and is directed toward the concave surface 38. Having entered the auxiliary resonator this ray travels back and forth between the concave dimple in the end mirror 18 and the compound suface formed by the flat and convexly curved reflective surfaces 34, 36 respectively moving progressively from left to right in the apparatus shown in FIG.2 until this ray strikes the convexly curved portion of the folding mirror on the right-hand side of the centerline and is directed radially away from the centerline. The near confocal condition of the auxiliary unstable resonator limits the divergence of the rays leaving the auxiliary resonator sufficiently that substantially all such rays are contained within the bounds of the primary resonator and the resonator losses are minimized. This type of reflected ray enhances the cross communication between the left and right-hand sides of the resonator as shown for example in FIG. 1, thereby minimzing the influence of the azimuthal variations in the refractive index of the gain medium. The second ray 42 is incident upon the flat surface 30 of the folding mirror and the ray is reflected toward the end mirror 18 along a path which is parallel to the centerline axis 20. The second ray is shown to be incident upon the end mirror 18 in a transitional region between the convexly and concavely shaped surfaces of the end mirror in a manner which causes the ray to be reflected back upon itself. The locii of a plurality of such second rays form a cylindrical surface which defines the interface between the auxiliary and primary resonators. Also, the rays within this surface furing their propagation through the primary resonator form a larger diameter cylindrical surface at the downstream edge of the gain medium which determines the downstream extent of the primary resonator. The third ray 44 is incident upon the folding mirror along the concial reflecting surface 30 and is also reflected vertically upward along a path which is parallel to the optical axis of the resonator. However, the third ray strikes the end mirror at a point on the reflective surface 28 which is convexly curved and this ray is reflected from the end mirror along a path which is divergent from the optical axis of the resonator. Such divergently oriented rays propagate through the axial region of the primary resonator in a manner suggested by the ray trace shown in FIG. 1.

The auxiliary resonator is always an unstable resonator and while this invention is described in terms of a particular set of auxiliary optics, various other combinations are also suitable. For example, end-planar with folding-convex, end convex with folding-planar or convex, and end concave with folding-convex or compound are all workable combinations.

The Fresnel Number of the auxiliary resonator is typically less than about ten percent of the Fresnel Number of the primary resonator so that the auxiliary resonator introduces only relatively small perturbations to the spatial profile of the radiation circulating through the primary resonator.

Although this invention has been shown and described with respect to preferred embodiments thereof, it should be understood by those skilled in the art that various changes and omissions in the form and detail thereof may be made therein without departing from the spirit and scope of the invention.

Having thus described a typical embodiment of my invention, that which I claim as new and desire to secure by Letter Patent of the United States is:

1. In a first unstable resonator having a centerline including both an end mirror with a reflective surface symmetric about the centerline and a folding mirror having a base and an apex with a reflective surface extending from the base to the apex to form a tapered reflector which is symmetric about the centerline and faces the end mirror, the improvement comprising a second unstable resonator formed along the centerline between the reflective surfaces of the end and folding mirrors.

2. The invention according to claim 1 wherein the folding mirror is a triangular prism.

3. The invention according to claim 1 wherein the folding mirror is a cone.

4. The invention according to claim 3 wherein the end mirror is circular.

5. The invention according to claim 4 wherein the circular reflective surface is substantially convex with respect to the cone and includes a concave depression which is spherically symmetric about the axis.

6. The invention according to claim 5 wherein the cone includes a compound reflective surface comprising a flat reflective surface perpendicular to the axis and a convexly curved reflective surface, each of which is symmetric about the axis.

7. The invention according to claim 4 wherein the circular end mirror has a central optical flat which is perpendicular to the axis.

8. The invention according to claim 7 wherein the folding mirror has a concave depression which is spherically symmetric about the axis.

9. The invention according to claim 1 wherein the Fresnel Number of the first resonator is more than ten times greater than the Fresnel Number of the second resonator.

10. The invention according to claim 1 wherein the reflective surfaces form a near confocal second unstable resonator.

11. A compound unstable resonator comprising:
a primary unstable resonator having a first end mirror which defines one end of the primary resonator, a folding mirror and, a third mirror which defines the other end of the primary resonator, the first end, the folding and the third mirrors being oriented to direct resonant radiation leaving the first end mirror to intercept the folding mirror and be redirected to the third mirror and also to direct resonant radiation leaving the third mirror to intercept the folding mirror and be redirected to the first end mirror, and
an auxiliary unstable resonator defined by reflective surfaces of the first end mirror and said folding mirror.

* * * * *

UNITED STATES PATENT OFFICE
CERTIFICATE OF CORRECTION

PATENT NO. : 4,025,172
DATED : May 24, 1977
INVENTOR(S) : Robert J. Freiberg

It is certified that error appears in the above-identified patent and that said Letters Patent are hereby corrected as shown below:

Column 2, line 5:   "located" should read -- locate --

Column 3, line 1:   "center" should read -- centers --

Column 3, line 24:  "3,622,901" should read -- 3,622,907 --

Column 3, line 60:  "instaces" should read -- instances --

Column 4, line 33:  "suface" should read -- surface --

Column 4, line 47:  "minimzing" should read -- minimizing --

Column 4, line 59:  "furing" should read -- during --

Column 4, line 64:  "concial" should read -- conical --

Column 5, line 29:  "Letter" should read -- Letters --

Column 3, line 8:   "ciruclar" should read -- circular --

Signed and Sealed this

Twenty-seventh Day of September

[SEAL]

Attest:

RUTH C. MASON
Attesting Officer

LUTRELLE F. PARKER
Acting Commissioner of Patents and Trademi